(12) United States Patent
Qi et al.

(10) Patent No.: US 10,929,153 B2
(45) Date of Patent: Feb. 23, 2021

(54) BIDIRECTIONAL PROTECTION OF APPLICATION PACKAGE

(71) Applicant: INTERNATIONAL BUSINESS MACHINES CORPORATION, Armonk, NY (US)

(72) Inventors: Hao Zong Qi, Beijing (CN); Min Xie, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/171,882

(22) Filed: Oct. 26, 2018

(65) Prior Publication Data
US 2020/0133690 A1   Apr. 30, 2020

(51) Int. Cl.
  *G06F 9/445* (2018.01)
  *G06F 21/12* (2013.01)
  (Continued)

(52) U.S. Cl.
  CPC .......... *G06F 9/44589* (2013.01); *G06F 21/12* (2013.01); *G06F 21/44* (2013.01); *G06F 21/64* (2013.01); *H04L 9/3247* (2013.01)

(58) Field of Classification Search
  CPC ...... G06F 9/44589; G06F 21/44; G06F 21/64; G06F 21/12; G06F 9/445; H04L 9/3247; H04L 9/32
  See application file for complete search history.

(56) References Cited

U.S. PATENT DOCUMENTS

| 8,060,747 | B1 * | 11/2011 | Leonard ................ H04L 9/3236 713/176 |
| 8,756,432 | B1 | 6/2014 | Chen et al. |

(Continued)

FOREIGN PATENT DOCUMENTS

| CN | 103544414 B | 8/2015 |
| CN | 105426708 A | 3/2016 |

OTHER PUBLICATIONS

Peter Mell et al, The NIST Definition of Cloud Computing, National Institute of Standards and Technology, Publication 800-145, 2011.

(Continued)

*Primary Examiner* — Ashokkumar B Patel
*Assistant Examiner* — Quazi Farooqui
(74) *Attorney, Agent, or Firm* — Patrick J. Daugherty; Daugherty & Del Zoppo Co., LPA

(57) ABSTRACT

Embodiments provide bidirectional signature protection for packaged apps by verifying an authored app as executable and downloadable from a trusted marketplace service in response to determining that a (first) unique signature embedded within binary code defining the authored app matches an original trusted marketplace service signature acquired from the trusted marketplace service. Embodiments store another (second) signature acquired from the binary code defining the authored app into a storage item of the trusted marketplace service, wherein the second signature is unique to the authored app and different from the first signature; and offer the verified, authored app for download from the trusted marketplace service, wherein the first signature and the second signature are embedded in binary code defining the authored app.

17 Claims, 6 Drawing Sheets

(51) Int. Cl.
*G06F 21/44* (2013.01)
*G06F 21/64* (2013.01)
*H04L 9/32* (2006.01)

(56) References Cited

U.S. PATENT DOCUMENTS

| | | | |
|---|---|---|---|
| 2004/0162989 A1* | 8/2004 | Kirovski | G06F 21/64 713/189 |
| 2014/0020061 A1* | 1/2014 | Popp | H04W 12/0023 726/3 |
| 2014/0032912 A1* | 1/2014 | Hardy | H04N 1/32144 713/176 |
| 2016/0092190 A1 | 3/2016 | Chen | |
| 2017/0277890 A1* | 9/2017 | Hayrynen | G06F 11/3688 |
| 2020/0084042 A1* | 3/2020 | Nelson | H04L 9/0894 |

OTHER PUBLICATIONS

Jin-Hyuk Jung et al, Repackaging Attack on Android Banking Applications and Its Countermeasures, Wireless Pers Commun, Springerlink.com, 2013.
Junfeng Xu, Toward a Secure Android Software Protection System, http://ieeexplore.ieee.org/document, 2015.
Eunhoe Kim, Detecting Illegally-Copied Apps on Android Devices, http://ieeexplore.ieee.org/document, 2013.
Heqing Huang, A Framework for Evaluating Mobile App Repackaging Detection Algorithms, Trust and Trustworthy Computing, http://link.springer.com, 2013.

* cited by examiner

BIDIRECTIONAL PROTECTION OF APPLICATION PACKAGE

BACKGROUND

Smartphones, personal computers, tablets and other programmable devices provide computer processing structures capable of executing a wide variety of individual programming applications or "apps." Apps are typically offered and organized in different application marketplaces that can be conveniently browsed by device users and then simply clicked to install and run on a variety of different operating systems and devices. App creators and platform vendors offer certified and original apps directly to user consumers via their own marketplaces, and through third-party marketplaces.

Original, certified or otherwise harmless apps may be "repackaged" or "repacked" to include malicious or other unauthorized code. By using reverse engineering tools to unpack an app file or otherwise disassemble an app program, unauthorized persons may add unauthorized malicious logic, and then re-package the code back into a complete app structure and upload the repackaged app to app markets. Downloading and executing a repacked app may result in a "repackaging attack" on the programmable device executing the repacked app, wherein the malicious code causes the user device to launch additional, malicious programs to execute in the background and thereby without awareness of the device user, wherein the malicious programs may acquire or compromise confidential user information, including by improperly acquiring user password, unique identifications, account information, or encrypt user data and demand ransom payments to unencrypt the data, etc.

SUMMARY

In one aspect of the present invention, a computerized method includes executing steps on a computer processor. Thus, a computer processor is configured to verify an authored app as executable and downloadable from a trusted marketplace service in response to determining that a (first) unique signature embedded within binary code defining the authored app matches an original trusted marketplace service signature acquired from the trusted marketplace service. Embodiments store another (second) signature acquired from the binary code defining the authored app into a storage item of the trusted marketplace service, wherein the second signature is unique to the authored app and different from the first signature; and offer the verified, authored app for download from the trusted marketplace service, wherein the first signature and the second signature are embedded in binary code defining the authored app.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to verify an authored app as executable and downloadable from a trusted marketplace service in response to determining that a (first) unique signature embedded within binary code defining the authored app matches an original trusted marketplace service signature acquired from the trusted marketplace service. Embodiments store another (second) signature acquired from the binary code defining the authored app into a storage item of the trusted marketplace service, wherein the second signature is unique to the authored app and different from the first signature; and offer the verified, authored app for download from the trusted marketplace service, wherein the first signature and the second signature are embedded in binary code defining the authored app.

In another aspect, a computer program product for bidirectional signature protection for packaged apps has a computer-readable storage medium with computer readable program code embodied therewith. The computer readable program code includes instructions for execution which cause the processor to verify an authored app as executable and downloadable from a trusted marketplace service in response to determining that a (first) unique signature embedded within binary code defining the authored app matches an original trusted marketplace service signature acquired from the trusted marketplace service. Embodiments store another (second) signature acquired from the binary code defining the authored app into a storage item of the trusted marketplace service, wherein the second signature is unique to the authored app and different from the first signature; and offer the verified, authored app for download from the trusted marketplace service, wherein the first signature and the second signature are embedded in binary code defining the authored app.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
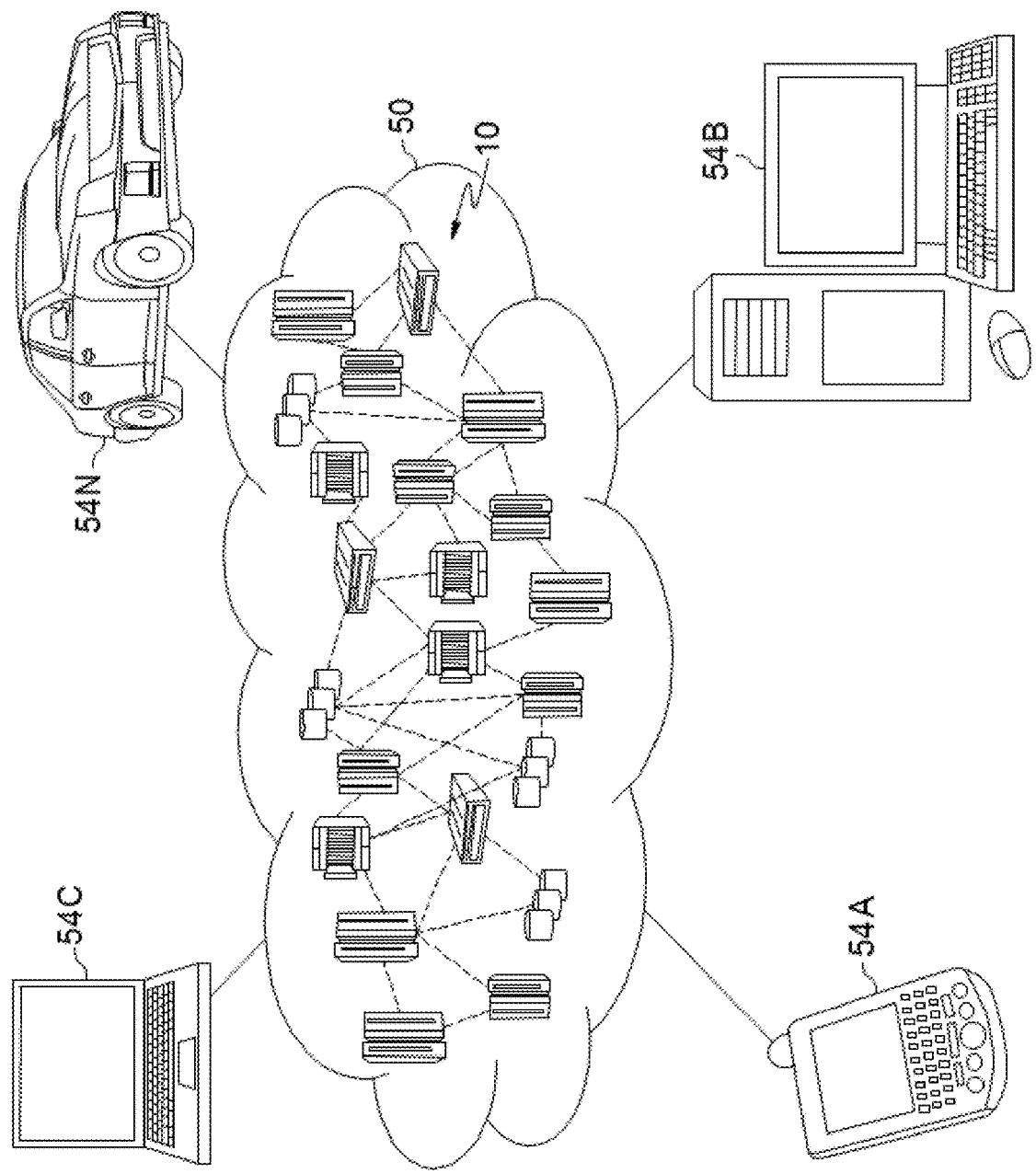
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
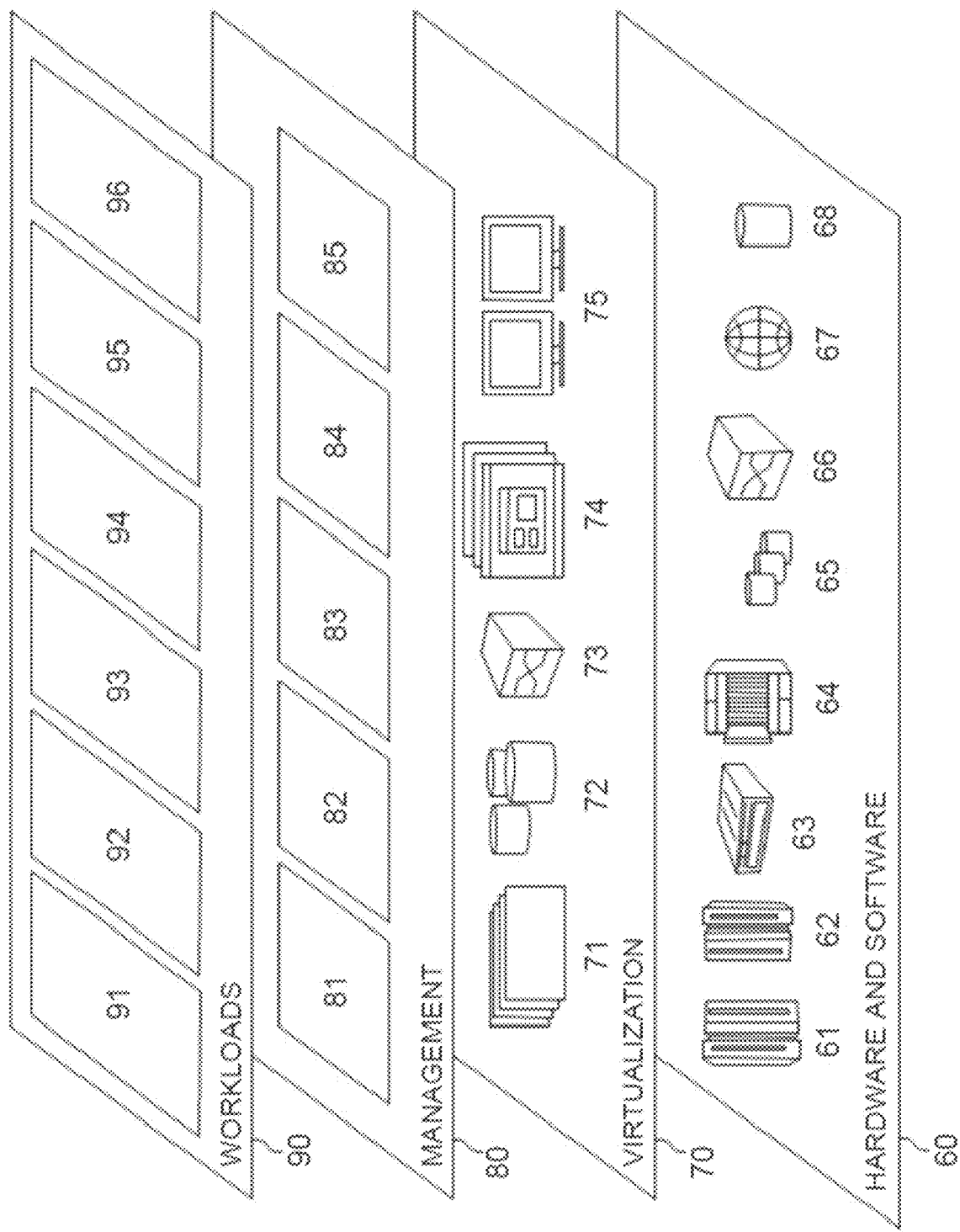
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for bidirectional signature protection for packaged apps according to aspects of the present invention 96.

Figure 3:
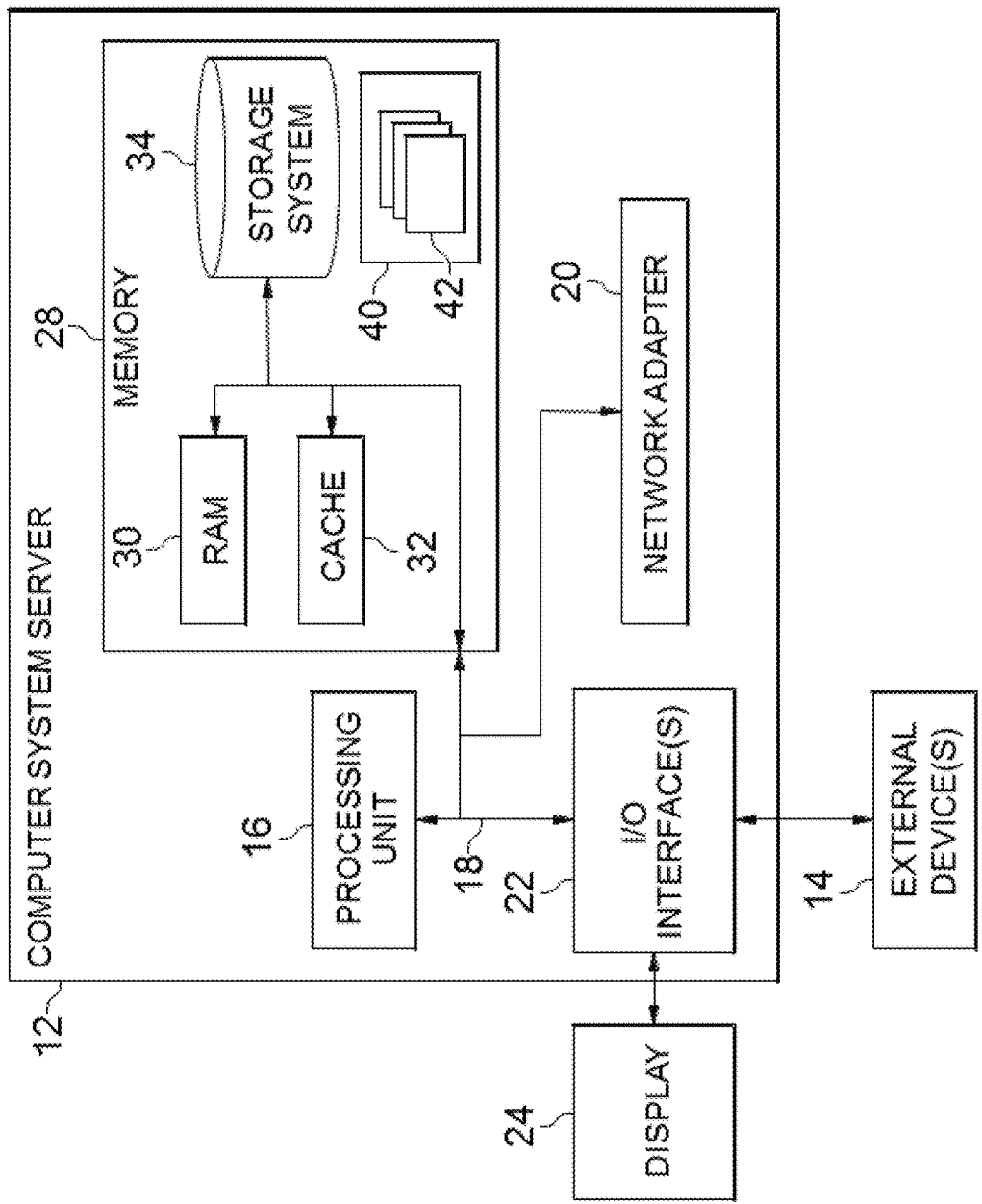
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

App marketplaces use a variety of security mechanisms to attempt to prevent the uploading and dissemination of repackaged or repacked apps to consuming users. However, such systems are deficient in enabling app authors or marketplace vendors to prevent others from uploading repacked apps, resulting in the offering of repacked apps in app marketplaces that present corresponding exposures to device users to threats posed by malicious code added to the repacked apps.

By means of illustration some aspects of the present invention are described herein with respect to implementations that protect apps designed to operate on the Android® platform or operating system. (ANDROID is a trademark of Google LLC in the United States or other countries.) However, embodiments of the present invention may also be implemented to protect other types of apps that are packaged to execute on other platforms, such as Apple® apps supported by the iOS® platform or operating system, and still other platforms or operating system-specific apps may be utilized with embodiments of the present invention, and the present illustrative examples are not limiting to the scope of the claimed inventions. (APPLE is a trademark of Apple, Inc. in the U.S. and other countries; IOS is a trademark of Cisco in the U.S. and other countries.)

In one illustrative but not exhaustive example, "Android application package" (APK) is the package file format used by the ANDROID platform or operating system for distribution and installation of application software and middleware. "APKTool" is a tool used by developers to debug the underlying code of an app on a step-by-step basis and makes working with an app easier by providing a project-like file structure and enabling the automation of some repetitive tasks. However, such convenient and powerful development features also enable "hackers" and other unauthorized, third-party persons to reverse engineer closed, binary coded ANDROID apps, wherein the hacker is enabled by APKTool to decode app resources to nearly original forms, and then rebuild the app while making modifications to incorporate additional, malicious code.

Prior art security techniques include attempts to make an original app hard to repack, such as by using obfuscated code. However, while obfuscation makes the underlying code unreadable to a hacker, it does not protect the APK file from being disassembled by the APKTool. Prior art approaches may also require that the executing device check a signature within the app in runtime; however, signatures and associated validation codes can be replaced by re-packers. Prior art systems may also enhance APK by inserting startup codes into ".so" files; however, the ".so" files may also be hacked or compromised.

Figure 4:
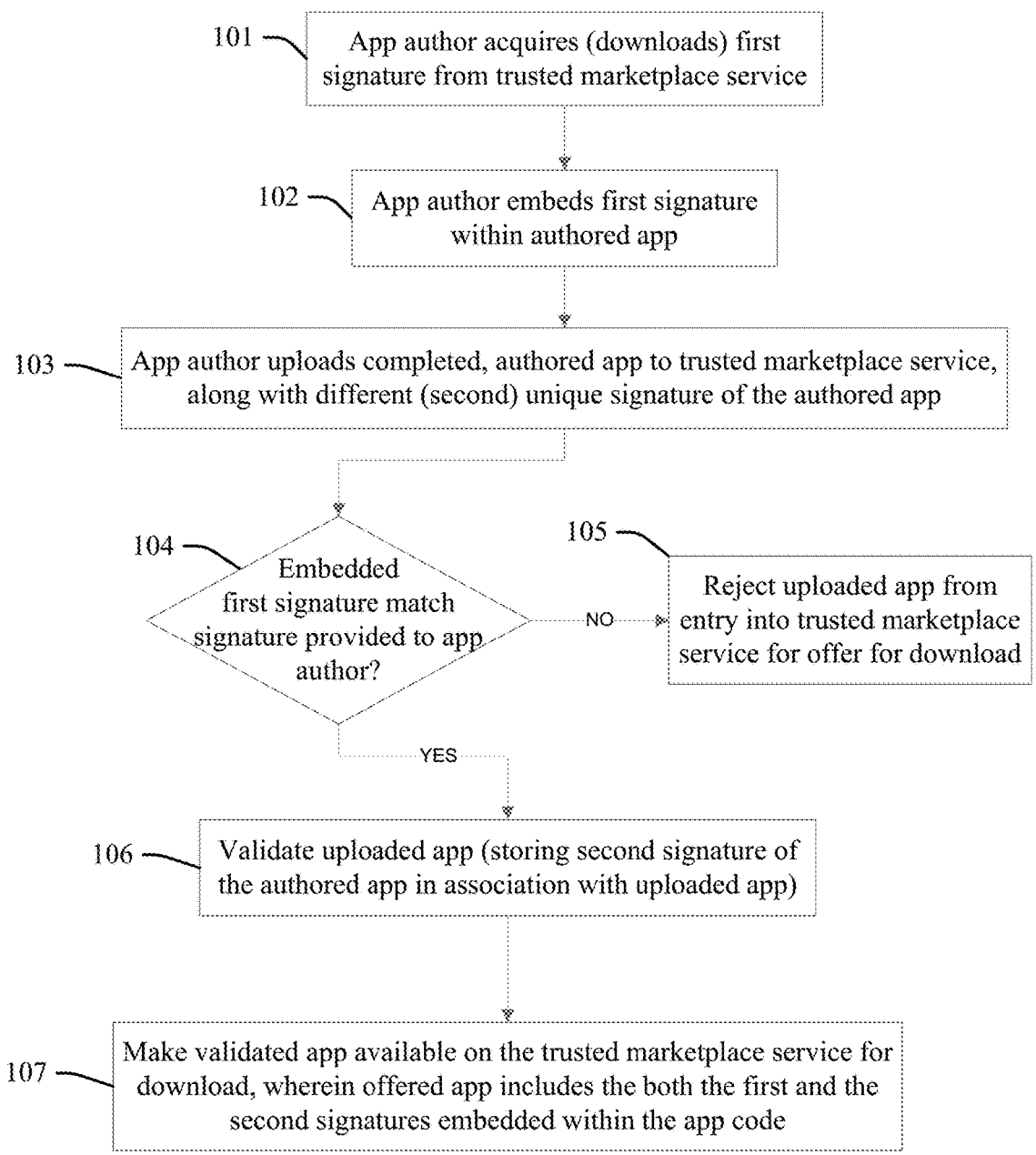
FIG. 4 is a flow chart illustration of an embodiment of the present invention.

FIG. 4 describes an app development process or phase according to the present invention, wherein the developer, creator or author of an app device acquires and stores the unique (first) signature of a trusted marketplace service within the original authored app code, and registers a different (second) unique signature of the authored app itself with the trusted marketplace service in order to upload the authored app to the trusted marketplace service for sale or other download to end-users.

Thus, at 101 an app author acquires (downloads) a first signature from a trusted marketplace service. In some embodiments the first signature is acquired at 101 in response to the author registering (logging in, providing credentials, etc.) via a secure communication channel connection to the trusted marketplace service (through a browser or portal application, etc.) and thereby establishing a status as a verified or authorized app author with respect to the trusted marketplace service.

At 102 the app author embeds the first signature within the authored app pursuant to the requirements of the trusted marketplace service. For example, the author follows process steps of an integration guide or other specified procedure that causes the first signature to be encased with a checksum value, to be inserted within a specific location or with a specific label or marker value within the app code, etc.

At 103 the app author uploads the authored app into the trusted marketplace service when the app is completed (for example, using a specified or secure market uploading service, web page portal, native tool, etc.), along with the (second), unique signature of the authored app that is different from the (first) signature acquired from the trusted marketplace service.

At 104 the trusted marketplace service validates the uploaded app as a function of the embedded first signature (for example, verifying that the values of embedded first signature match the first signature provided to the app author at 101).

In response to determining at 104 that verification of the embedded first signature fails, at 105 the uploaded app is rejected from entry into the trusted marketplace service for offer for download.

In response to a positive verification of the embedded first signature at 104, at 106 the trusted marketplace service validates the uploaded app, stores the second, unique signature of the authored app in an item accessible for storage and retrieval of the signature by the trusted marketplace service (sometimes hereinafter referred to as a "storage item") in association with the uploaded, verified app. Illustrative but not limiting or exhaustive examples of a storage item used by the trusted marketplace service for storage and retrieval of the second signature include a local or networked memory device, a secured database file, an encrypted file, and still other examples will be apparent to one skilled in the art.

At 107 the trusted marketplace service makes the validated app available for download to the programmable devices of other end-users, wherein the offered app includes the both of the first and the second signatures (embedded) within the app code.

Figure 5:
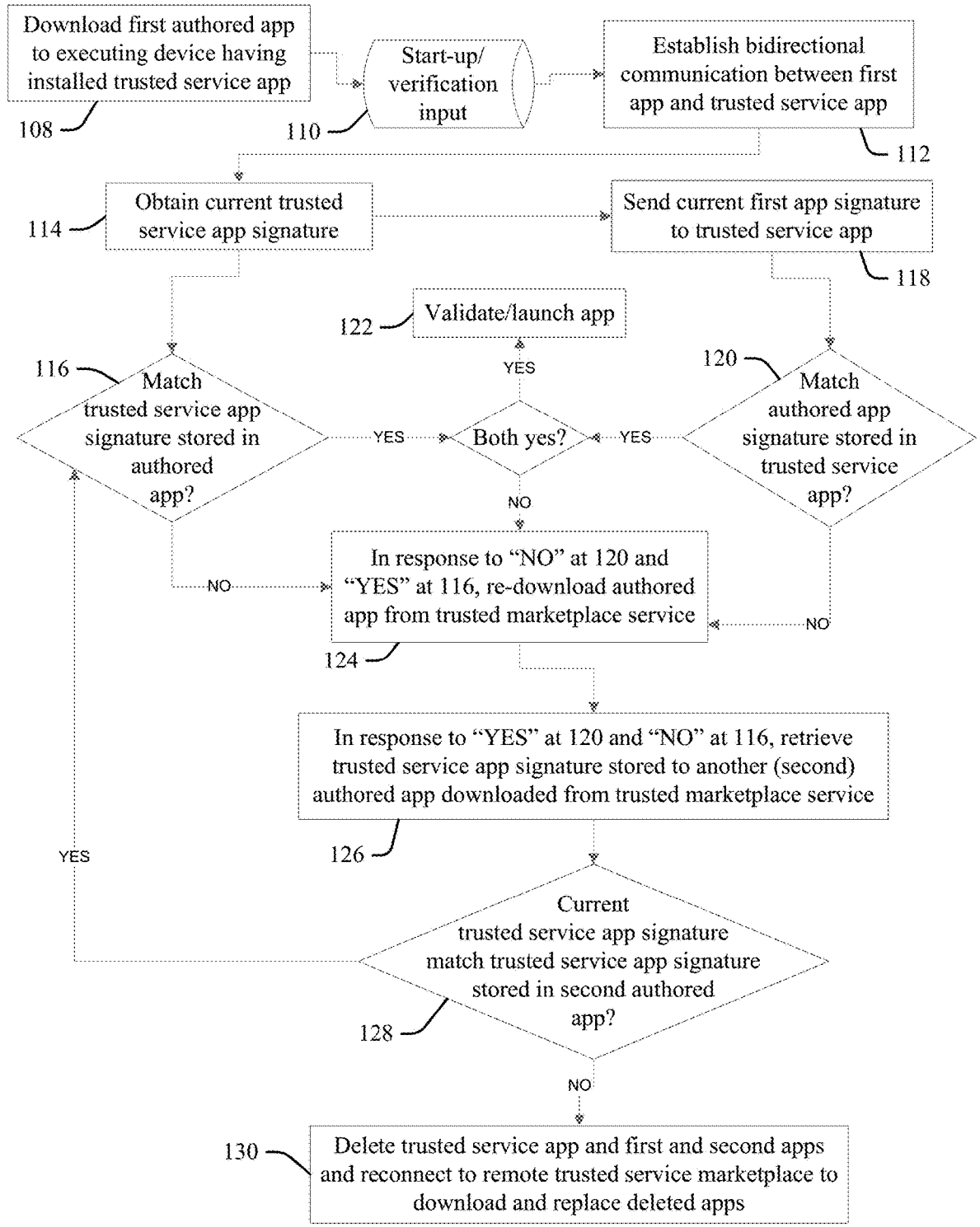
FIG. 5 is a flow chart illustration of another aspect or embodiment of the present invention.

FIG. 5 is a flow chart illustration of app execution or implementation of an embodiment of the present invention, wherein the authored app has been downloaded at 108 to an executing device from the remote trusted marketplace service or otherwise installed on an executing device upon which a "trusted service app" has also been downloaded and installed from the trusted marketplace service. More particularly, the trusted service app is established (downloaded, installed, certified, registered, etc.) on the executing device via secure communication channel connection from the remote, trusted marketplace service that provides (or is associated to) the trusted service app. The secure communication channel connects the executing device to the trusted app marketplace service networked (cloud) resource or programmable device for the secure exchange of data.

In response to a start-up or verification input 110 with respect to the authored app to a process executing on a processor of the executing device that is configured according to the present invention (the "configured processor"), at 112 the configured processor establishes bidirectional communication between the trusted service app and the authored app. The executing device may be the same as a device used to create the authored app, or they may be different devices.

At 114 the configured processor obtains a current unique signature from the trusted service app via the bidirectional communication channel, and at 116 determines whether the obtained, current signature matches the (first) trusted service app signature stored to the authored app code (thus, as established with respect to the validated app at 104 of FIG. 4).

At 118 the configured processor transmits (sends) a current signature of the app via the bidirectional communication channel to the trusted service app, and at 120 causes the trusted service app to compare the sent, current signature to the unique (second) signature stored within an item configured for storage of the trusted service app signature in association to the app (thus, at 106 of FIG. 4).

At 122 the app is validated or verified as genuine, (as not unpacked and repackaged, and therefore as not likely to include malicious code) and launched wherein the input at 110 is a launch input, in response to determining positive ("yes") determinations at 116 that the obtained, current signature matches the (first) trusted service app signature stored to the authored app code in association to the trusted marketplace, and at 120 that the current app signature matches the unique (second) signature stored within the storage item of the trusted service app in association to the app.

If either of said determinations 116 and 120 is a negative ("No") output, in response to determining a respective signature mismatch, the configured processor executes different actions based on different combinations of the matching resultant output values at 116 and 120. Thus, in response to a "no" output at 120 (signifying that the current app signature does not match the value at the trusted service app) and a "yes" output at 116 (signifying that the trusted service app signature matches at 116), at 124 the configured processor re-downloads the authored app to the executing device from the trusted marketplace service: this reflects a determination that the trusted service app is not "repacked" or otherwise hacked or compromised, and accordingly may be trusted to establish a secure connection to the trusted marketplace service to download a valid, un-repacked version of the authored app to replace the current app, wherein the current version is discarded as likely repacked (due to the app signature mismatch at 120).

Alternatively, in response to a "yes" output at 120 (signifying that the current app signature matches the stored value at the trusted marketplace, and is likely valid and not repacked), and a "no" output at 116 (signifying that the trusted service app signature does not match at 116 and therefore that the trusted service app may be "repacked" or otherwise hacked or comprised, at 126 the configured processor obtains a trusted service app signature stored to another (second) app that was also downloaded from the trusted service marketplace in the bidirectional signature exchange process of FIG. 4, and again attempts to verify the trusted service app at 128 via matching analysis to the trusted service app signature saved to the other, second authored app.

Thus, a "yes" output at 128 signifies that the trusted service app signature matches the signature stored in the second app, and therefore that the trusted service app is recertified as trusted, wherein the process returns to 116 so that the first authored app is verified to launch (in response to a "yes" value at 120), or is re-downloaded at 124.

Otherwise, a "no" output at 128 signifies that the trusted service app does not match the signature stored in the second app, and therefore that the trusted service app is likely "repacked" or otherwise compromised, wherein at 130 the configured processor deletes the trusted service app and both of the first and second authored apps. The process at 130 reflects a policy decision that are the trusted service app has been compromised, any other authored app installed on the device may also be compromised, and they cannot be verified via bidirectional signature comparison with the trusted service app, and therefore, they should be deleted and reinstalled from the remote trusted service marketplace, along with a new, verified version of the trusted service app.

In some embodiments (not shown) the processes at 126 does not attempt to verify the trusted service app via matching analysis to a trusted service app signature saved to another, second authored app: instead in response to the "no" output at 116 the configured processor deletes the trusted service app and the first authored app, without performing an additional bidirectional signature comparison with another (second) authored app.

Figure 6:
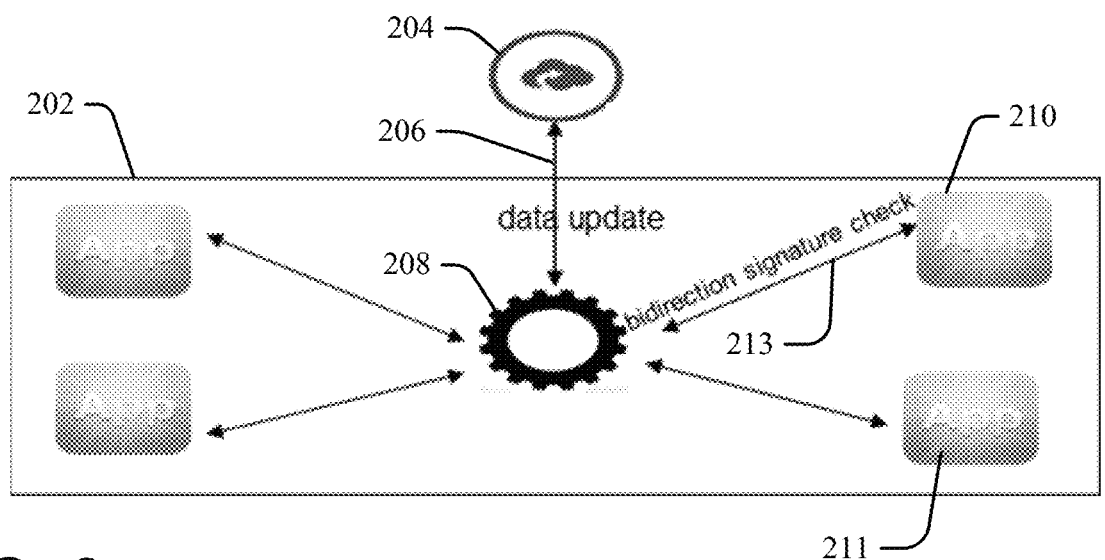
FIG. 6 is a graphic illustration of an implementation of an embodiment of the present invention.

FIG. 6 is a graphic illustration of implementation of an embodiment of the present invention. A trusted service app 208 according to the present invention and authored apps (including first authored app 210 and second authored app 211) are installed on a smart phone programmable device operating system 202, pursuant to the process of FIG. 4. Thus, in response to a prompt to open or verify the first authored app 210, the smart phone processor establishes a bidirectional link 213 between the first app 210 and the trusted service app 208, and executes the signature-matching processes described above with respect to the process of FIG. 5. Further, in the event that any of the apps 208, 210, and 211 are determined to be "repacked" (due to a signature mismatch), the trusted service app 208 establishes a secure communication channel 206 with the remote trusted marketplace service 204, wherein replacement apps may be downloaded to the device operating system 202.

The trusted service app 208 may also be updated by the remote trusted marketplace service 204 via the secure communication channel 206, for example, to update authored app signatures stored to the trusted service app 208, or stored on the remote trusted marketplace service 204 and linked to the trusted service app 208 for use in signature matching. Thus, the trusted service app can update itself on-line, whenever the mobile device operation system 202 is connected to the internet, or on a periodic basis. In one example, signature updates may be used to prompt downloads of updated or improved versions of an authored app: though the original may not have been compromised, by updating the signature used in matching to a different signature, an embodiment may ensure that the older version is not verified for launching (at 122, of FIG. 5), causing the trusted service app 208 to instigate a replacement download of the older authored app.

Thus, aspects of the present invention utilize two separate and distinct signature mechanisms to verify that an uploaded app is not repacked as a function of comparison to a trusted service app of a trusted marketplace providing the app to end users, wherein both app and the trusted service app must be verified via their own distinct signatures in order to launch the downloaded app.

Aspects may require multiple stakeholders to take part in maintaining the viability of the bidirectional signature process. For example, an app author, creator or vendor may be responsible to get signature and associated security information for a trusted marketplace, via ensuring that an appropriate trusted service app is installed on the authoring device prior to creating or finalizing the app; and for registering the authored app to the trusted marketplace (via the trusted service app).

App operating system and device service providers, manufacturers and vendors may be responsible to provide official, secure communication channel structures for authors to exchange signature information with a remote trusted marketplace center, for downloading verified apps and registering or updating signature and other security information; and for ensuring that pre-installed trusted service app are genuine, and not repacked.

End-users or consumers of the downloaded, authored and trusted service apps need generally take no specific actions to verify the genuine, un-repacked status of a given app, or to manually or intentionally run a check of apps in their device: such verification processes are preformed automatically, in the background, whenever an app is opened, via the process of FIG. 5. Further, "REPACK" notifications may be pushed to the trusted service apps on the user devices via the secure official channel from the marketplace service, causing the device to instigate downloading or replacement apps in the background, without requiring any action on the part of the end-user.

Embodiments provide advantages over prior art security and verification mechanisms. For example, embodiments automatically ensure that general users are using trusted apps, and via secure channel communications between the user device and the trusted marketplace that avoid exposures to leaking privacy information, and the potential costs associated with unwanted divulgation of confidential user information. Advantages to app authors include a robust and automated process to detect the opening of repacked apps, protecting against exposure to claims of loss from end-users that would otherwise be impacted by opening a repacked app. Advantages for mobile device manufacturers include the automated prevention of downloading of untrusted apps from unknown, third-party app marketplaces, wherein the trusted service app may be used to require that users download and open apps from only trusted marketplace channels that are certified by trusted service apps resident on the devices.

Thus, embodiments may form the basis of a secure app ecosystem among manufacturers, app authors and general users. Users are enabled to identify fake or repacked apps easily: regardless of which trusted app store an app is downloaded from, the device of the user automatically identifies the genuine status of a given app. By automatically deleting compromised apps and replacing them with verified apps, embodiments protect authorship rights, prevent loss exposure and maintain the business reputation of original app authors that generate high-quality, non-malicious apps for end-user consumption.

Advantages are provided by use of the trusted service app in the bidirectional, dual-signature verification process. By using bidirectional signature verification between any given app and the trusted service app to verify the genuine status of each app, embodiments avoid inefficiencies in time and processing or memory resource demands that would arise from requiring pairwise comparison among all apps in one device, wherein the trusted service app functions as a more-efficient base-point in the bidirectional security information verification. Further, the genuineness of the trusted service app itself can be validated by use of any one of the other genuine apps resident on the device, since the verification is bidirectional and requires only one pairing of another downloaded app to the trusted service app to execute the verification process.

What is claimed is:

1. A computer-implemented method for bidirectional signature protection for packaged apps, comprising executing on a computer processor:

verifying an authored app as executable and downloadable from a trusted marketplace service in response to determining that a first unique signature embedded within binary code defining the authored app matches an original trusted marketplace service signature acquired from the trusted marketplace service;

storing a second signature acquired from the binary code defining the authored app into a storage item of the trusted marketplace service, wherein the second signature is unique to the authored app and different from the first signature;

offering the verified, authored app for download from the trusted marketplace service, wherein the first signature and the second signature are embedded in binary code defining the authored app;

in response to a prompt to execute a copy of the authored app on a hosting programmable device, acquiring a current trusted service app signature from a trusted service app that is loaded onto the hosting programmable device;

acquiring a current version of the first signature that is embedded within the binary code defining the authored app;

acquiring a current version of the second signature that is embedded within the binary code defining the authored app; and enabling execution of the authored app in response to determining that the current trusted service app signature matches the acquired current version of the first signature that is embedded within the binary code defining the authored app, and that the acquired current version of the second signature that is embedded within the binary code defining the authored app matches a copy of the second signature that is stored in the storage item of the trusted service app.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the verifying the authored app as executable and downloadable from the trusted marketplace service, the storing the second signature acquired from the binary code defining the authored app into the storage item of the trusted marketplace service, the offering the verified, authored app for download from the trusted marketplace service, the acquiring the current trusted service app signature from the trusted service app, the acquiring the current version of the first signature that is embedded within the binary code defining the authored app, the acquiring the current version of the second signature that is embedded within the binary code defining the authored app, and the enabling execution of the authored app.

3. The method of claim 2, wherein the computer-readable program code is provided as a service in a cloud environment.

4. The method of claim 1, further comprising:
labeling the trusted service app as repacked in response to determining that the current trusted service app signature does not match the acquired current version of the first signature that is embedded within the binary code defining the authored app.

5. The method of claim 4, further comprising:
labeling the authored app as repacked in response to determining that the acquired current version of the second signature that is embedded within the binary code defining the authored app does not match the copy of the second signature that is stored in the storage item of the trusted service app.

6. The method of claim 5, further comprising:
downloading a replacement version of the authored app from the trusted marketplace service that is associated to the trusted service app, in response to determining that the acquired current version of the second signature that is embedded within the binary code defining the authored app does not match the copy of the second signature that is stored in the storage item of the trusted service app, and that the current trusted service app signature matches a copy of the first signature that is embedded within binary code defining the another authored app that is installed on the hosting programmable device.

7. The method of claim 5, further comprising:
in response to determining that that the current trusted service app signature does not match the acquired current version of the first signature that is embedded within the binary code defining the authored app, and to determining that the acquired current version of the second signature that is embedded within the binary code defining the authored app does not match the copy of the second signature that is stored in the storage item of the trusted service app:
preventing execution of the authored app by an operating system of the programmable device; and
deleting the authored app and the trusted service app from the programmable device.

8. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
verifies an authored app as executable and downloadable from a trusted marketplace service in response to determining that a first unique signature embedded within binary code defining the authored app matches an original trusted marketplace service signature acquired from the trusted marketplace service;
stores a second signature acquired from the binary code defining the authored app into a storage item of the trusted marketplace service, wherein the second signature is unique to the authored app and different from the first signature;
offers the verified, authored app for download from the trusted marketplace service, wherein the first signature and the second signature are embedded in binary code defining the authored app;
in response to a prompt to execute a copy of the authored app on a hosting programmable device, acquires a current trusted service app signature from a trusted service app that is loaded onto the hosting programmable device;
acquires a current version of the first signature that is embedded within the binary code defining the authored app;
acquires a current version of the second signature that is embedded within the binary code defining the authored app; and
enables execution of the authored app in response to determining that the current trusted service app signature matches the acquired current version of the first signature that is embedded within the binary code defining the authored app, and that the acquired current version of the second signature that is embedded within the binary code defining the authored app matches a copy of the second signature that is stored in the storage item of the trusted service app.

9. The system of claim 8, wherein the processor executes the program instructions stored on the computer-readable storage medium via the computer readable memory and thereby labels the trusted service app as repacked in response to determining that the current trusted service app signature does not match the acquired current version of the first signature that is embedded within the binary code defining the authored app.

10. The system of claim 9, wherein the processor executes the program instructions stored on the computer-readable storage medium via the computer readable memory and thereby labels the authored app as repacked in response to determining that the acquired current version of the second signature that is embedded within the binary code defining the authored app does not match the copy of the second signature that is stored in the storage item of the trusted service app.

11. The system of claim 10, wherein the processor executes the program instructions stored on the computer-readable storage medium via the computer readable memory and thereby downloads a replacement version of the authored app from the trusted marketplace service that is associated to the trusted service app, in response to determining that the acquired current version of the second signature that is embedded within the binary code defining the authored app does not match the copy of the second signature that is stored in the storage item of the trusted service app, and that the current trusted service app signature matches a copy of the first signature that is embedded within binary code defining the another authored app that is installed on the hosting programmable device.

12. The system of claim 10, wherein the processor executes the program instructions stored on the computer-readable storage medium via the computer readable memory and thereby, in response to determining that that the current trusted service app signature does not match the acquired current version of the first signature that is embedded within the binary code defining the authored app, and to determining that the acquired current version of the second signature that is embedded within the binary code defining the authored app does not match the copy of the second signature that is stored in the storage item of the trusted service app:
- prevents execution of the authored app by an operating system of the programmable device; and
- deletes the authored app and the trusted service app from the programmable device.

13. A computer program product for bidirectional signature protection for packaged apps, the computer program product comprising:
- a computer readable storage medium having computer readable program code embodied therewith, the computer readable program code comprising instructions for execution by a processor that cause the processor to:
- verify an authored app as executable and downloadable from a trusted marketplace service in response to determining that a first unique signature embedded within binary code defining the authored app matches an original trusted marketplace service signature acquired from the trusted marketplace service;
- store a second signature acquired from the binary code defining the authored app into a storage item of the trusted marketplace service, wherein the second signature is unique to the authored app and different from the first signature;
- offer the verified, authored app for download from the trusted marketplace service, wherein the first signature and the second signature are embedded in binary code defining the authored app;
- in response to a prompt to execute a copy of the authored app on a hosting programmable device, acquire a current trusted service app signature from a trusted service app that is loaded onto the hosting programmable device;
- acquire a current version of the first signature that is embedded within the binary code defining the authored app;
- acquire a current version of the second signature that is embedded within the binary code defining the authored app; and
- enable execution of the authored app in response to determining that the current trusted service app signature matches the acquired current version of the first signature that is embedded within the binary code defining the authored app, and that the acquired current version of the second signature that is embedded within the binary code defining the authored app matches a copy of the second signature that is stored in the storage item of the trusted service app.

14. The computer program product of claim 13, wherein the computer readable program code instructions for execution by the processor further cause the processor to label the trusted service app as repacked in response to determining that the current trusted service app signature does not match the acquired current version of the first signature that is embedded within the binary code defining the authored app.

15. The computer program product of claim 14, wherein the computer readable program code instructions for execution by the processor further cause the processor to label the authored app as repacked in response to determining that the acquired current version of the second signature that is embedded within the binary code defining the authored app does not match the copy of the second signature that is stored in the storage item of the trusted service app.

16. The computer program product of claim 15, wherein the computer readable program code instructions for execution by the processor further cause the processor to download a replacement version of the authored app from the trusted marketplace service that is associated to the trusted service app, in response to determining that the acquired current version of the second signature that is embedded within the binary code defining the authored app does not match the copy of the second signature that is stored in the storage item of the trusted service app, and that the current trusted service app signature matches a copy of the first signature that is embedded within binary code defining the another authored app that is installed on the hosting programable device.

17. The computer program product of claim 15, wherein the computer readable program code instructions for execution by the processor further cause the processor to, in response to determining that that the current trusted service app signature does not match the acquired current version of the first signature that is embedded within the binary code defining the authored app, and to determining that the acquired current version of the second signature that is embedded within the binary code defining the authored app does not match the copy of the second signature that is stored in the storage item of the trusted service app:
- prevent execution of the authored app by an operating system of the programmable device; and
- delete the authored app and the trusted service app from the programmable device.

* * * * *